United States Patent Office 2,856,294
Patented Oct. 14, 1958

2,856,294

MOLD INHIBITING PROCESSES AND PRODUCTS THEREOF

Carl F. Brown, Jersey City, N. J., Chester M. Gooding, Staten Island, N. Y., and Hans W. Vahlteich, Englewood, N. J., assignors to The Best Foods, Inc., New York, N. Y., a corporation of New Jersey No Drawing. Application May 28, 1954
Serial No. 433,296

8 Claims. (Cl. 99—166)

The present invention relates to novel processes and products for the retardation and prevention of the growth of microbiological contaminants or microorganisms, and fungi in particular, on solid and semi-solid shaped products which normally foster the growth of such organisms.

The terms "microorganisms" and "microbiological contaminants" are employed in this application in their generic sense and are intended to include a number of bacterial species as well as fungi. The present invention finds its most effective application in the inhibition of the growth of fungi, which includes mildews, rusts, smuts and molds, etc., particularly the latter. For the sake of convenience, the inhibitory function of the invention will be described primarily with respect to fungi, and more specifically, molds.

It is one object of the present invention to provide novel compositions of matter for use in coating solid or shaped products to retard and prevent the growth of microbiological matter, the growth of which the product would normally foster.

It is an additional object of the present invention to provide novel coated solid or shaped products which are resistant to microbiological contamination.

It is an additional object of the present invention to provide novel processes for coating solid or shaped products, which are normally subject to the growth of fungi, to prevent the coated product from being attacked by these organisms.

Other objects and advantages of the present invention will be apparent to those skilled in the art from reading the specification which follows:

There are many products which are vulnerable to attack by microbiological material, such as fungi, and molds in partciular. The resulting contamination with fungi, or other microbiological material, results in damage to the product and often requires its partial or total destruction. This is particularly true of many food products, which are often merchandised or processed in relatively large shapes and sizes. These include the cheeses, which are often merchandised in the form of wheels or boluses, and other foods, such as meats and sliced or shaped meat products, fruits, etc., both as picked and after being processed by drying. The present invention is particularly suitable to prevent attack by fungi on those products which are merchandised or processed in relatively large shapes and sizes. It is most effective in protecting those shaped or formed products which normally are marketed with an outer coating or wrapping of a material which is appreciably or substantially impermeable to the diffusion of moisture. The present invention is believed to be most applicable to the treatment of cheeses which are normally processed and marketed with a moisture-impermeable wax outer coating.

In the wax coating of cheeses and other products there has long been a problem of obtaining a coated product which is protected from adventitious mold contamination for considerable periods of time. Cheeses, in the form of wheels or boluses, which are waxed in accordance with the practice customary in the industry, suffer during handling and merchandising, as a result of which the wax coatings frequently become damaged and develop cracks into which air-borne mold spores find their way. Furthermore, there is always an opportunity for surface contamination of the cheeses prior to coating with the wax, both during the time when the formed or shaped cheeses are being dried or matured in the course of their manufacture and prior to the time of wax coating. As a result of these unavoidable exposures to fungi, the cheeses become contaminated with molds and at least a part of the value of the coated product is lost.

Efforts have been directed to alleviating these difficulties and others which face the cheese producer by treating the product with a fungistatic agent. To date these efforts have not been satisfactory. The incorporation of these fungistatic agents into the cheese or placing the agent upon the surface of the cheese or other formed product is only partially successful and results in the build-up of large concentrations of the fungistatic agents in the food product itself or in untoward effects upon the properties of the food product. For example, a fungistatic agent cannot be incorporated directly into the body of a cheese before curing as it will inhibit the growth of the microorganisms responsible for the curing of the cheese and destroy the texture, quality and other properties, including the identity of the cheese. It is, of course, the goal of food manufacturers and processers to reduce to a minimum the concentrations of foreign chemical agents in food products.

Other efforts have been directed to introducing a fungistatic agent into the wax or other substantially water-impermeable coating prior to being applied to the formed food product. This has also been unsatisfactory. In order to apply waxes in coating such products it is necessary to melt the wax by heating to relatively high temperatures. The fungistatic agents are not tolerant to elevated temperatures and this has produced untoward results as well as the loss of appreciable amounts of fungistatic agent due to volatilization at these elevated temperatures. In addition it has been found that the incorporation of the fungistatic agent in the wax is a very inefficient and ineffective way to employ the fungistatic agent since most of it remains entrapped in the wax and cannot diffuse to the surface of the food or other coated product to perform its intended fungistatic function.

The present invention provides a means of overcoming the objectionable features of the prior art and which may employ dipping techniques with which the art is generally familiar. The present invention comprises the coating of the shaped or solid product with one of the novel coating compositions of the present invention. This coating process of the present invention permits an efficient and effective means for coating the shaped or solid product to provide a coating which is in intimate contact with the surface of the coated product and which will combat the growth of fungi.

The novel coating compositions of the present invention comprise an aqueous gel or dispersion of a hydrophyllic gum which contains an edible, non-toxic fungistatic agent. In general these compositions comprise a suspension or solution of an organic acid, edible, non-toxic fungistatic agent in an aqueous dispersion of a colloidally-soluble hydrophyllic gum. For best results, these aqueous gum dispersions are desirably those which have a viscosity range at the temperature of their application to the solid product which will give a reading with the G-3 cup of a Zahn viscometer of from about 18 to 50 seconds. These viscosity readings for the coating composition containing the fungistatic agent also should desirably fall within the range of from about 20 to 60 seconds. The fungistatic agents may be incorporated into the aqueous dispersion of the hydrophyllic gum in varying amounts, such as an amount in excess of ½% by weight, although for optimum results the concentration shall be between 2% and 4%.

The hydrophyllic gums employed to produce the coating solution are materials with which those skilled in the art are familiar. These gums may be of natural or synthetic origin. It is contemplated that these gums may also be employed in the form of their non-toxic, colloidally-soluble salts. It is contemplated that the gums employed shall be those which are composed solely of carbon, hydrogen and oxygen. Among the gums of natural origin which are satisfactory are the following carbohydrate gums: gum tragacanth, locust-bean gum, gum acacia, gum Karaya, Irish moss, pectin, dextran, maize starches and other high boiling starches. Among the gums of synthetic origin which have been found to be satisfactory are: polyvinyl alcohol, the methyl ethers of cellulose, such as methyl cellulose, and particularly carboxy methyl cellulose and its sodium salt.

The fungistatic agents contemplated for employment in the novel coating compositions of the present invention include those with which the art is familiar for this purpose. In general, it is preferred to employ the edible, non-toxic, organic acids.

Among the fungistatic agents contemplated for use in the present invention are organic carboxylic acids having an unsaturated carbon to carbon linkage adjacent to the carboxyl group in accordance with the following formula:

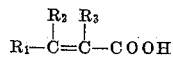

That portion of the molecule containing the carbon to carbon unsaturation (alpha-beta unsaturation) may be either an aliphatic or aromatic hydrocarbon group. Where more than one unsaturated carbon to carbon linkage exists in the molecule, such unsaturation should be part of a conjugated double bond system with the alpha-beta carbon to carbon unsaturation. In the formula given above, $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen atoms. Examples of such acids are crotonic, isocrotonic, dimethylacrylic, alpha-hexenoic, benzoic, sorbic, salicylic and para-hydroxybenzoic acids. The preferred acids according to this embodiment of the invention are benzoic, para-hydroxybenzoic, sorbic and alpha-hexenoic acids. Benzoic and sorbic acids are the most suitable.

Other fungistatic agents which may satisfactorily be employed are the saturated aliphatic carboxylic acids containing up to and including 10 carbon atoms. These include propionic, butyric, valeric and caproic acids, etc. In those cases where taste is an important factor discretion should be exercised to use those acids which are free from disagreeable tastes and odors. Of this group propionic acid is the preferred fungistatic agent.

Another fungistatic agent which may be satisfactorily employed is dehydroacetic acid.

The preferred fungistatic agents for employment in the present invention are the unsaturated aliphatic monocarboxylic acids falling within the hereinabove described structural formula and which are described in U. S. Letters Patent No. 2,379,294 of Chester M. Gooding, which issued on June 26, 1945. These acids are entirely aliphatic in character and possess at least one double bond in the alpha position in relation to the carboxyl group. These acids have the following general formula:

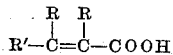

In this formula R represents a hydrogen atom or an alkyl group, R' represents an aliphatic hydrocarbon radical. Among the acids contemplated in accordance with this formula are sorbic acid, alpha-hexenoic acid (also known as isohydrosorbic acid), crotonic acid (trans form), isocrotonic acid (cis form), beta-ethyl acrylic acid and dimethylacrylic acid. Crotonic acid may have an objectionable taste and odor and where the fungistatic acid is to be used in quantities sufficient to impart taste properties to the treated product, it is preferred to employ one of the other acids such as sorbic acid, which in addition to being highly effective as a mold-growth inhibiting agent, is also quite tasteless and odorless. Because of its superior qualities, sorbic acid is the preferred fungistatic agent for use in the invention.

The novel coating compositions of the present invention may be prepared in any suitable manner. One procedure which has given satisfactory results is to first grind together the dry hydrophyllic gum and the fungistatic agent before mixing either of these components with the water. Alternately, either the hydrophyllic gum or the fungistatic agent may be mixed first with the water, after which the other is incorporated into the resulting mixture. Best results are obtained where sufficient hydrophyllic gum is employed to provide an aqueous gum dispersion giving a reading of 18 to 50 seconds at the temperature of application to the solid product when measured on a G-3 cup of a Zahn viscometer. After the fungistatic agent has been added the viscosity reading should fall within the range of 20 to 60 seconds.

The coating of the solid or shaped product may be accomplished by dipping the product into the coating composition for a sufficient length of time to provide a complete wetting of the product to be coated. Alternately, one may brush or spray the coating on the product to be coated. After the product has been coated, the coating is permitted to dry to provide a solid, continuous film about the product. Most satisfactory results are obtained where a second coating or wrapping is placed over the hydrophyllic gum coating. This second coating or wrapping is desirably of a moisture-impervious nature. Contemplated in this category are the wax coatings normally used to coat cheeses. These may include a single wax or mixtures of waxes found satisfactory for this purpose. Additionally, the second or outer coating may be in the form of cellophane or other plastic film materials used as a coating or wrapper.

The above procedure may be varied, as will be described more specifically in Example 5 hereinbelow, by applying the coating composition to a wrapping film, such as a cellophane sheet, and the dried coating composition placed next to the solid product to be wrapped with the wrapping film.

Products coated with an intermediate hydrophyllic gum coating containing the fungistatic agent and an outer substantially water-impervious coating enjoy a significant advantage over other types of coated products with which the art is familiar. The hydrophyllic gum coating will thus remain moist, thick and gelatinous and will permit the fungistatic agent to exist in a physical condition in which it is available and diffusable to permit maximum effectiveness for its intended purpose.

In order more clearly to disclose the nature of the present invention, specific examples illustrating the practice of the invention will hereinafter be described. It should be understood, however, that this is done solely by way of example and is intended neither to delineate the scope of the invention nor limit the ambit of the appended claims. Unless otherwise stated, quantities of materials are referred to in terms of parts by weight.

Example 1

A mixture was prepared comprising 2 parts of sorbic acid dispersed and suspended in an aqueous solution consisting of 3 parts of sodium salt of carboxymethyl cellulose sold to the trade as CMC-sodium salt, medium viscosity [i. e., a 2% (by weight) aqueous solution has a viscosity in the range of 300 to 600 centipoises at 77°

F. as measured with a Brookfield viscometer] in 95 parts of water. This was accomplished in accordance with what has been found to be the best way for preparing the coating compositions of the present invention which is to first grind together the dry sorbic acid and the dry sodium salt of carboxymethyl cellulose prior to mixing with water. The resulting ground mixture was then slowly sifted into the specified quantity of water while stirring, at a temperature between 160° and 190° F. After about one to three hours of stirring, the sodium salt of carboxymethyl cellulose was completely hydrated and dissolved, thus providing at this temperature a moderately viscous medium for dispersion of the still largely undissolved sorbic acid. This coating composition was found to be capable of maintaining the sorbic acid in a suspended state for as long as 1 week at a temperature of 155°–160° F.

A 25-pound wheel of natural processed cheese was dipped in a bath of the above described coating composition while maintaining the bath at a temperature of 140° F. by holding the cheese under the bath surface for a period of about 10 seconds. The cheese wheel was removed from the bath, drained and transferred to the drying room and allowed to remain there under a controlled relative humidity of about 50% to 75% and at a temperature of 50° to 55° F. for a period of about 2 hours. Forced, filtered air circulation was used to facilitate drying of the protective coating film. When the coating had become sufficiently dried and firm, the coated cheese was immersed in a second bath comprising a commercial mixture of molten waxes at a temperature of a little over 200° F. for a period of 5 to 10 seconds. The cheese thus coated in accordance with the above two-step process exhibited markedly improved resistance to mold formation. In fact, losses from this cause were substantially eliminated.

*Example 2*

Lemons, after being washed to remove insecticidal spray residues, were passed through a bath comprising a 1% aqueous solution of dehydroacetic acid containing also 5% polyvinyl alcohol, high viscosity grade [i. e., a 4% (by weight) aqueous solution has a viscosity at 68° F. of 55 centipoises as determined with a Höeppler viscometer]. The dipped fruit was then allowed to pass through a tunnel drier under a forced draft of circulating air whereby a dried film containing dehydroacetic acid was formed which completely enclosed and protected the surface of the lemons from exterior contamination by air-borne molds. For marketing purposes the thus coated lemons may be individually wrapped in the usual tissue paper, if desired.

The bath used in the foregoing example was prepared by sifting the dehydroacetic acid into an already dissolved 5% aqueous solution of polyvinyl alcohol, high viscosity grade. The dipping bath may be employed at room temperatures in this instance.

*Example 3*

Pork link-sausages which had been encased in perforated casings were effectively preserved from mold growth by first applying a coating composition containing sorbic acid and then enclosing the coated sausages in cellophane. The coating composition for spraying or dipping the link-sausages contained in the perforated casings was prepared by suspending 3 parts of powdered sorbic acid in 92 parts of water containing 1½ parts of gum tragacanth. The dipped sausages were dried by artificial heat and forced air circulation prior to final packaging in cellophane.

*Example 4*

Dried prunes were passed on a continuous open-mesh conveyor belt into a chamber in which a mist was maintained by pressure spraying of a dispersion of 1 part sorbic acid and 99 parts of 2% aqueous solution of cellulose methyl ether, medium viscosity [i. e., 2% aqueous solution of this gum at 68° F. had a viscosity range of 350 to 550 centipoises]. Because the spray solution contains dispersed but undissolved sorbic acid, it cannot be conveniently sprayed through a conventional spray nozzle. In order to avoid this difficulty encountered with conventional nozzles, the mixture to be converted to a mist-spray was pumped in a fine stream and allowed to impinge upon the vortex of a set of rapidly revolving blades or fan-like structure. The mist not utilized in coating the prunes was collected on the walls of the chamber and returned to a sump wherefrom it was re-circulated by the pump and was again thrown in a stream upon the revolving blades. After this spray treatment, the coating on the prunes was dried by passing them through a circulating air chamber.

*Example 5*

The coating composition prepared in Example 1 was employed as a coating for cellophane to be used as wrappings for sliced Swiss cheese. The aqueous composition was applied to one side of the cellophane sheeting by a continuous roller applicator, after which the film was dried in a tunnel having counter-current forced air circulation and the dried film was then rewound to form a roll.

The compositions of this invention may have many other uses which will be apparent to those skilled in the art. For example, certain of the gums, particularly the sodium salt of carboxymethyl cellulose, in conjunction with a fungistatic agent, may be useful as a laundry after-rinse, whereby both slight starching and protection against subsequent mold growth, known as mildewing, especially prior to ironing, may be achieved. Other compositions of this invention may be utilized in coating of papers and transparent films to be used for wrapping of fruits, vegetables, leather articles, etc., to prevent their subsequent deterioration due to growth of molds.

The term "fungi" is employed in this application in its generic sense. Thus the term is intended to encompass those specific forms of fungi comprising molds, mildews, rusts, smuts, etc.

The term "fungistatic" agent, acid or material as employed in this application is intended to refer to the ability of the chemical agent to arrest and retard the development of fungi, as well as the more powerful action which constitutes destroying the organism. The terms also encompass the bacterial inhibiting properties of these substances.

The term "solid" as employed in this application is intended to include products which are not in the true sense rigid. Thus it is contemplated that solids shall encompass products which may be referred to in some cases as "semi-solids"; but which would not be classified as liquids.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. A novel coated composition which is resistant to the attack of fungi, comprising a solid food product, which normally fosters the growth of fungi, said solid product having in intimate contact a first and inner continuous coating produced by drying an aqueous dispersion having a viscosity which will produce a reading of from about 20 to 60 seconds with the G–3 cup of a Zahn viscometer, said aqueous dispersion containing from about 0.5% to 4% of an edible, non-toxic fungistatic agent and a sufficient amount of a colloidally-soluble hydrophyllic gum to provide the stated viscosity; and a second and outer coating of a substantially moisture-impermeable material over said first coating.

2. A novel coated composition which is resistant to the attack of fungi, comprising a solid cheese product having in intimate contact a first and inner continuous coating produced by drying an aqueous dispersion having a viscosity which will provide a reading of from about 20 to 60 seconds with the G-3 cup of a Zahn viscometer, said aqueous dispersion containing from about 0.5% to 4% of sorbic acid and a sufficient amount of the sodium salt of carboxymethylcellulose to provide the stated viscosity; and a second and outer coating of a substantially moisture-impermeable wax over said first coating.

3. A novel process for inhibiting the growth of microbiological material in and on solid food products which normally foster the growth of such material, comprising coating said solid product with an aqueous dispersion having a viscosity which will provide a reading of from about 20 to 60 seconds with the G-3 cup of a Zahn viscometer, said aqueous dispersion containing from about 0.5% to 4% of an edible, non-toxic fungistatic agent and a sufficient amount of a colloidally-soluble hydrophyllic gum to provide a stated viscosity, drying the resulting coating and finally coating the resulting product with a second and outer coating of a substantially moisture-impermeable material.

4. A novel process for inhibiting the growth of fungi in and on a solid cheese product, comprising coating said solid cheese product with an aqueous dispersion having a viscosity which will provide a reading of from about 20 to 60 seconds with the G-3 cup of a Zahn viscometer, said aqueous dispersion containing from about 0.5% to 4% of sorbic acid and a sufficient amount of the sodium salt of carboxymethylcellulose to provide the stated viscosity, drying the resultant coating, and finally coating the resulting product with a second and outer coating of a substantially moisture-impermeable wax.

5. A novel coated composition as defined by claim 1, wherein the solid product is a food product selected from the class consisting of cheese, meats, fruits and dried fruits.

6. A novel coated composition as defined by claim 1, wherein the hydrophyllic gum is selected from the class consisting of synthetic and naturally-occurring gums.

7. A novel coated composition as defined by claim 1, wherein the fungistatic agent is an organic carboxylic acid having the formula $$R_1-C=C-COOH$$
$$\phantom{R_1-}\overset{R_2}{|}\phantom{=}\overset{R_3}{|}$$

wherein $R_1$ is selected from the group consisting of hydrogen and an aliphatic hydrocarbon radical and $R_2$ and $R_3$ are selected from the group consisting of carbon atoms forming a carbocyclic nucleus with the unsaturated carbon linkage C=C of the acid and hydrogen atoms and being further characterized in that $R_1$ is hydrogen when $R_2$ and $R_3$ form a carbocyclic nucleus and $R_1$ is an aliphatic hydrocarbon radical when $R_2$ and $R_3$ are hydrogen atoms.

8. A novel process as defined by claim 3, wherein the solid product is a food product selected from the class consisting of cheese, meats, fruits and dried fruits, the hydrophyllic gum is selected from the class consisting of synthetic and naturally-occurring gums, and the fungistatic agent is an edible, non-toxic organic acid.

References Cited in the file of this patent

UNITED STATES PATENTS

| | | |
|---|---|---|
| 2,292,323 | Ingle | Aug. 4, 1942 |
| 2,379,294 | Gooding | June 26, 1945 |
| 2,558,042 | Cornwell | June 26, 1951 |
| 2,567,010 | Coleman et al. | Sept. 4, 1951 |
| 2,585,501 | Rusoff et al. | Feb. 12, 1952 |
| 2,724,650 | Melnick | Nov. 22, 1955 |
| 2,733,151 | Zuercher | Jan. 31, 1956 |

OTHER REFERENCES

"Modern Packaging," December 1953, pp. 139-141 and 184.